(12) United States Patent
Strauch et al.

(10) Patent No.: US 6,259,219 B1
(45) Date of Patent: Jul. 10, 2001

(54) MULTIPLE SENSOR SPEED CONTROLLER FOR A DRIVEN MEMBER

(75) Inventors: Andrew Mark Strauch, Yokohama (JP); Daniel W. Costanza, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1222 days.

(21) Appl. No.: 08/729,835

(22) Filed: Oct. 9, 1996

Related U.S. Application Data

(63) Continuation of application No. 08/343,394, filed on Nov. 22, 1994, now abandoned.

(51) Int. Cl.[7] ....................................................... H02P 7/00
(52) U.S. Cl. ............................................................ 318/285
(58) Field of Search ..................................... 318/280–282, 318/466–470, 254, 435, 138; 49/26, 28; 160/291, 292

(56) References Cited

U.S. PATENT DOCUMENTS

| | | | |
|---|---|---|---|
| 3,655,954 | 4/1972 | Speth ................................ | 235/150.1 |
| 4,529,920 | * 7/1985 | Yoshida et al. ....................... | 318/466 |
| 4,563,625 | * 1/1986 | Kornbrekke et al. ............. | 318/283 X |
| 4,645,991 | 2/1987 | Ban et al. ............................ | 318/331 |
| 4,736,144 | * 4/1988 | Chun-Pu ........................... | 318/283 X |
| 4,914,726 | 4/1990 | Burke . | |
| 5,073,746 | 12/1991 | Sakamoto et al. ................... | 318/560 |
| 5,101,145 | 3/1992 | Rehm . | |
| 5,204,602 | 4/1993 | Iwashita ............................... | 318/630 |
| 5,245,258 | * 9/1993 | Becker et al. ..................... | 318/466 X |
| 5,396,458 | * 3/1995 | Long et al. ....................... | 318/282 X |
| 5,404,673 | * 4/1995 | Takeda et al. ........................... | 49/28 |

FOREIGN PATENT DOCUMENTS

| | | |
|---|---|---|
| 0349975 | 1/1990 | (EP) . |
| 6004277 | 7/1985 | (JP) . |
| 6308137 | 1/1988 | (JP) . |

OTHER PUBLICATIONS

Soviet Inventions Illustrated, Section EI, Week 8809, Jun. 1987.

Fujikawa K. et al "Robust and Fast Speed Control for Torsional System Based on State Space Method" Oct. 28, 1991.

* cited by examiner

*Primary Examiner*—Anthony Wysocki
(74) *Attorney, Agent, or Firm*—Kevin R. Kepner

(57) ABSTRACT

An apparatus and method for precisely controlling a driven component in an electromechanical system, particularly for controlling the speed of a photoreceptor or intermediate transfer belt in an electrophotographic printing machine. A sensor monitors the speed of the driven belt and generates and sends a signal indicative thereof to a controller. A second sensor monitors the rotational speed of the drive motor for the component and also generates a signal indicative thereof and sends that signal to the controller. The controller processes the signals so that a preselected belt speed is maintained while minimizing or eliminating torque disturbances caused by the rapid fluctuation of the motor velocity without the necessity of using an inertial flywheel.

11 Claims, 6 Drawing Sheets

MULTIPLE SENSOR SPEED CONTROLLER FOR A DRIVEN MEMBER

This application is a continuation of Application Ser. No. 08/343,394, filed Nov. 22, 1994, now abandoned.

This invention relates generally to an electrophotographic printing machine, and more particularly concerns an improved method and apparatus for controlling the lateral movement of a moving belt.

In a typical electrophotographic printing process, a photoconductive member is charged to a substantially uniform potential so as to sensitize the surface thereof. The charged portion of the photoconductive member is exposed to a light image to selectively dissipate the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering electrostatically to carrier granules. The toner particles are attracted from the carrier granules to the latent image forming a toner powder image on the photoconductive member. The toner powder image is then transferred from the photoconductive member to a copy sheet by "tack" transfer: i.e., the copy sheet is attached to the photoreceptor with a sufficiently high force to overcome external forces that might otherwise tend to cause slip. The toner particles are heated to permanently affix the powder image to the copy sheet.

The foregoing generally describes a typical black and white electrophotographic printing machine. With the advent of multicolor electrophotography, it is desirable to use the so-called tandem architecture which comprises a plurality of image forming stations. This tandem architecture offers potential for high throughput and image quality. One choice of photoreceptors in this tandem engine architecture is a drum based photoreceptor architecture used in combination with an intermediate transfer medium. Belt type photoreceptors can also be used in combination with either an intermediate transfer belt or an intermediate transfer drum.

The following disclosures may be relevant to various aspects of the present invention:

U.S. Pat. No. 5,204,602 Patentee: Iwashita Date of Issue: Apr. 20, 1993

U.S. Pat. No. 5,073,746 Patentee: Sakamoto, et al Issue Date: Dec. 17, 1991

U.S. Pat. No. 4,645,991 Patentee: Ban, et al Issue Date: Feb. 24, 1987

U.S. Pat. No. 3,655,954 Patentee: Speth Issue Date: Apr. 11, 1972

The relevant portions of the foregoing disclosures may be briefly summarized as follows:

U.S. Pat. No. 5,204,602 describes a servo motor control method capable of automatically affecting optimum backlash acceleration correction under various machine operating conditions. A backlash acceleration correction process is started when the sign of a positional deviation is inverted, and is cyclicly executed thereafter. A cutting speed is estimated from the square root of the positional deviation at the start of the correction process, and a constant, used to calculate a backlash acceleration amount, and a backlash acceleration time are calculated in accordance with the estimated cutting speed. By inverting the sign of the output of an integrator of a speed loop, moreover, a target value is obtained which is equal in magnitude to the integrator output and whose sign is opposite to that of the integrator output. In each processing cycle, the product of the constant and the difference between the target value and the present integrator output is obtained, and a torque command to be used for the drive control of the servo motor is obtained in accordance with the speed command after the backlash acceleration correction, which is obtained by adding the resultant product to a speed command calculated in a position loop process.

U.S. Pat. No. 5,073,746 discloses a speed control method for a servo motor capable of smoothly rotating the servo motor without causing pulsating rotation even when the servo motor rotates at low speeds. On the basis of numbers f feedback pulses detected and stored at intervals of a period equal to a value obtained by dividing an estimated speed calculation period by an integer multiple of two, the number of feedback pulses in each estimated speed calculation period and the number of pulses in a time period from a mid point of an estimated speed calculation period immediately before each estimated speed calculation period to a mid point of each estimated speed calculation period are calculated, and an estimated speed indicative of an actual rotation speed of the servo motor is further calculated on the basis of the calculated numbers of pulses.

U.S. Pat. No. 4,645,991 discloses an apparatus for removing torque ripples which comprises a permanent magnet rotor position sensors stator armature coils in operational circuit for affecting arithmetic operation on detected signals from the position sensors and a control circuit for driving the stator armature coils. According to another embodiment, an apparatus for removing torque ripples includes a direct current motor having Y connected armature coils, a detector for detecting the counter electromotive forces in the direct current motor, an operational circuit for effecting an arithmetic operation on output signals from the detector and a transistor for driving the direct current motor.

U.S. Pat. No. 3,655,954 discloses a closed loop system having are regulated system portion having a number of integration members. The regulator feedback which is connected between output and input of the regulated system portion comprises regulator control means for automatically adapting the amplification of the regulator to variations in application occurring in the regulated system portion during operation of the latter. The regulator control means comprises a first differentiating stage of the nth order, on at least partial analog of said regulated system portion, a quotient forming divider having two inputs of which one is connected to the first differentiating stage to the output of the regulated system portion, and the other is connected through the analog to the input of the regulated system portion. A second differentiating stage is connected with the analog and adapted for phase coincidence of the two signals at the respective two in points of the quotient forming divider.

In accordance with one aspect of the present invention, there is provided an apparatus for controlling the velocity of a motor driven component of an electromechanical system. The apparatus comprises a first sensor adapted to detect the velocity of the driven component and generate a first signal indicative thereof, a second sensor adapted to detect the velocity of the motor and generate a second signal indicative thereof and a controller, responsive to the first signal and the second signal, for generating a motor control signal.

Pursuant to another aspect of the present invention, there is provided a method for controlling the velocity of a motor driven component of an electromechanical system. The method comprises detecting the velocity of the driven component and generating a first signal indicative thereof, detecting the velocity of the motor and generating a second signal indicative thereof and generating a motor control signal as a function of the first signal and the second signal.

Pursuant to yet another aspect of the present invention, there is provided an electrophotographic printing machine having a precise velocity control for driving a member. The machine comprises a motor operatively connected to the member, and a first sensor operatively associated with the member to detect the velocity of the driven member and generate a first signal indicative thereof. A second sensor, to detect the velocity of said motor and generate a second signal indicative thereof and a controller, responsive to the first signal and the second signal to generate a motor control signal are also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 5:
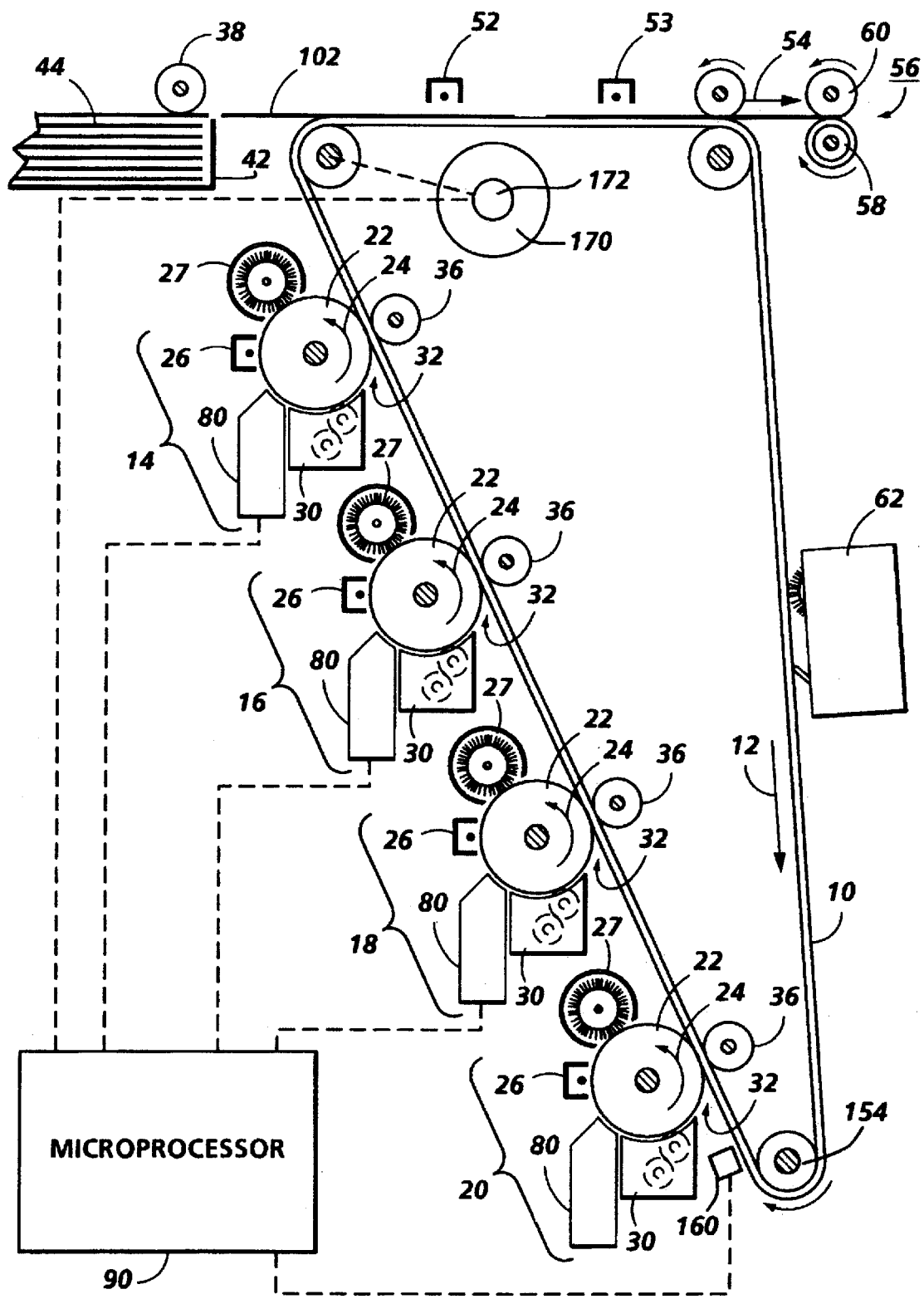
FIG. 5 is a schematic elevational view depicting an illustrative multicolor electrophotographic printing machine incorporating the apparatus of the present invention.

For a general understanding of the features of the present invention references are made to the drawings. In the drawings, like reference numerals have been used throughout to designate identical elements. Referring now to FIG. 5, an intermediate belt designated generally by the reference numeral 10 is mounted rotatably on the machine frame. Belt 10 rotates in the direction of arrow 12. Four imaging reproducing stations indicated generally by the reference numerals 14, 16, 18 and 20 are positioned about the periphery of the belt 10. Each image reproducing station is substantially identical to one another. The only distinctions between the image reproducing stations is their position and the color of the developer material employed therein. For example, image reproducing station 14 uses a black developer material, while stations 16, 18 and 20 use yellow, magenta and cyan colored developer material. Inasmuch as stations 14, 16, 18 and 20 are similar, only station 20 will be described in detail.

At station 20, a drum 22 having a photoconductive surface deposited on a conductive substrate rotates in direction of arrow 24. Preferably, the photoconductive surface is made from a selenium alloy with the conductive substrate being made from an electronically grounded aluminum alloy. Other suitable photoconductive surfaces and conductive substrates may also be employed. Drum 22 rotates in the direction of arrow 24 to advance successive portions of the photoconductive surface through the various processing stations disposed about the path of movement thereof.

Initially, a portion of the photoconductive surface of drum 22 passes beneath a corona generating device 26. Corona generating device 26 charges the photoconductive surface of the drum 22 to a relatively high, substantially uniform potential.

Next, the charged portion of the photoconductive surface is advanced through the imaging station. At the imaging station, an imaging unit indicated generally by the reference numeral 80, records an electrostatic latent image on the photoconductive surface of the drum 22. The imaging stations 80 may be any type of raster input/output scanning device (RIS/ROS). A RIS device typically has document illumination lamps, optics, a scanning drive, and photosensing elements, such as a CCD array, i.e. a charge coupled device. A RIS device scans an original document one line at a time generating electrical raster image signals representative of a particular color component in the original document. The RIS captures the image from the original document and converts the image to a series of raster scan lines which are transmitted as electrical signals to an image processing system (IPS) which may be a portion of controller 90 which is preferably, a self-contained, dedicated minicomputer.

The IPS generates electrical signals according to a prescribed scheme from the raster image signals representative of the original document. The conventional circuitry of the IPS is well known to one skilled in the art. A user interface (UI) will generally be in communication with the IPS to enable an operator to control the various operator adjustable functions. A ROS generates a raster image of the original document in response to the electrical signals from the IPS. The raster output scanner lays out the electrostatic latent image in a series of horizontal scan lines with each line having a specified number of pixels per inch. Preferably, the raster output scanner employs a laser which generates a modulated beam of light rays which are scanned across the drum 22 by rotating a polygon mirror.

It should be understood the imaging stations 80 are not limited to RIS/ROS combinations. For instance, an ROS could be interfaced with a microprocessor in which data can be inputted therein by use of a keyboard terminal. The microprocessor would then generate an electrical signal representative of the inputted data. The ROS, responsive to the electrical signals of the microprocessor, would then generate a raster image, representative of the data stored in the microprocessor, to record an electrostatic latent image on a selected one of the photoreceptors 22. Alternatively, the raster output scanner may use light emitting diode array write bars. In this way, an electrostatic latent image is recorded on the photoconductive surface of the drum 22.

Next, a developer unit indicated generally by the reference numeral 30 develops the electrostatic latent image with a cyan colored developer material. Image reproducing stations 14, 16 and 18 use black, yellow and magenta colored developer materials respectively. The latent image attracts toner particles from the carrier granules of the developer material to form a toner powder image on the photoconductive surface of drum 22. After development of the latent image with cyan toner, drum 22 continues to move in direction of arrow 24 to advance the cyan toner image to a transfer zone 32 where the cyan toner image is transferred from drum 22 to intermediate belt 10 by an intermediate transfer device such as a biased transfer roll 36.

At transfer zone 32, the developed powder image is transferred from photoconductive drum 22 to intermediate belt 10. Belt 10 and drum 22 have substantially the same tangential velocity in the transfer zone 32. Belt 10 is electrically biased to a potential of sufficient magnitude and polarity by biased transfer roll 36 to attract the developed powder image thereto from drum 22. Preferably, belt 10 is made from a conductive substrate with an appropriate dielectric coating such as a metallized polyester film.

After the cyan toner image is transferred to the belt 10 at reproducing station 20, belt 10 advances the cyan toner image to the transfer zone of reproducing station 18 where a magenta toner image is transferred to belt 10, in superimposed registration with the cyan toner image previously transferred to belt 10. After the magenta toner image is transferred to belt 10, belt 10 advances the transferred toner images to reproducing station 16 where the yellow toner image is transferred to belt 10 in superimposed registration with the previously transferred toner images. Finally, belt 10 advances the transferred toner images to reproducing station 14 where the black toner image is transferred thereto in superimposed registration with the previously transferred toner images. After all of the toner images have been transferred to belt 10 in superimposed registration with one another to form a multicolor toner image, the multicolor toner image is transferred to a sheet of support material, e.g., a copy paper at the transfer station.

At the transfer station, a copy sheet is moved into contact with the multicolor toner image on belt 10. The copy sheet 102 is advanced to transfer station from a stack of sheets 44 mounted on a tray 42 by a sheet feeder 38. The copy sheet 102 is advanced into contact with the multicolor image on belt 10 beneath corona generating unit 52 at the transfer station. Corona generating unit 52 sprays ions on to the back side of the sheet to attract the multicolor image to the front side thereof from belt 10. After transfer, the copy sheet passes under a second corona generating unit 53 for detack and continues to move in the direction of arrow 54 to a fusing station. The fusing station includes a fuser assembly generally indicated by the reference numeral 56, which permanently affixes the transferred toner image to the copy sheet. Preferably, fuser assembly 56 includes a heated fuser roll 58 and a backup roller 60 with the toner image on the copy sheet contacting fuser roller 58. In this manner, the toner image is permanently affixed to the copy sheet. After fusing, the copy sheets are then fed either to an output tray (not shown) or to a finishing station (not shown), which may include a stapler or binding mechanism.

Referring once again to reproducing station 20, invariably, after the toner image is transferred from drum 22 to belt 10, some residual particles remain adhering thereto. These residual particles are removed from the drum surface 22 at the cleaning station 27. Cleaning station includes a rotatably mounted fibrous or electrostatic brush in contact with the photoconductive surface of drum 22. The particles are cleaned from the drum 22 by rotation of the brush in contact therewith.

After the print sheet is separated from surface of belt 10, the residual toner/developer and paper fiber particles adhering to the surface are removed therefrom at cleaning station 60. Cleaning station 60 includes a rotatably mounted fibrous brush in contact with belt surface to disturb and remove paper fibers and a cleaning blade to remove the nontransferred toner particles. The blade may be configured in either a wiper or doctor position depending on the application.

The various machine functions are regulated by controller 90. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It is believed that the foregoing description is sufficient for the purposes of the present application to illustrate the general operation of a tandem printing machine.

Depending upon the specifics of a particular application, the pass to pass process direction registration specification on a photoreceptor module for multiple exposure color (either single pass or multi pass) generally ranges from 15 microns to 60 microns for the photoreceptor process direction. Key to the strategy to achieve this level of registration is to limit the photoreceptor errors to be identical for each color separation. That is, whatever motion nonuniformities occur during the first color image must be repeated for all of the other colors, thus eliminating any relative motion and misregistration. This requires that the photoreceptor motion errors be synchronous with the image to image spacing.

By proper sizing of the photoreceptor roll diameters, they can be made to rotate an integer number of times as the photoreceptor travels from one imaging zone to another. If this is accomplished, the run out errors of the rolls which affect the photoreceptor motion quality will not generate registration errors. This property of synchronism permits a reasonable tolerance to be placed on the drive elements physical dimensions but also puts restrictions on the drive element physical size and image to image spacing.

Figure 1:
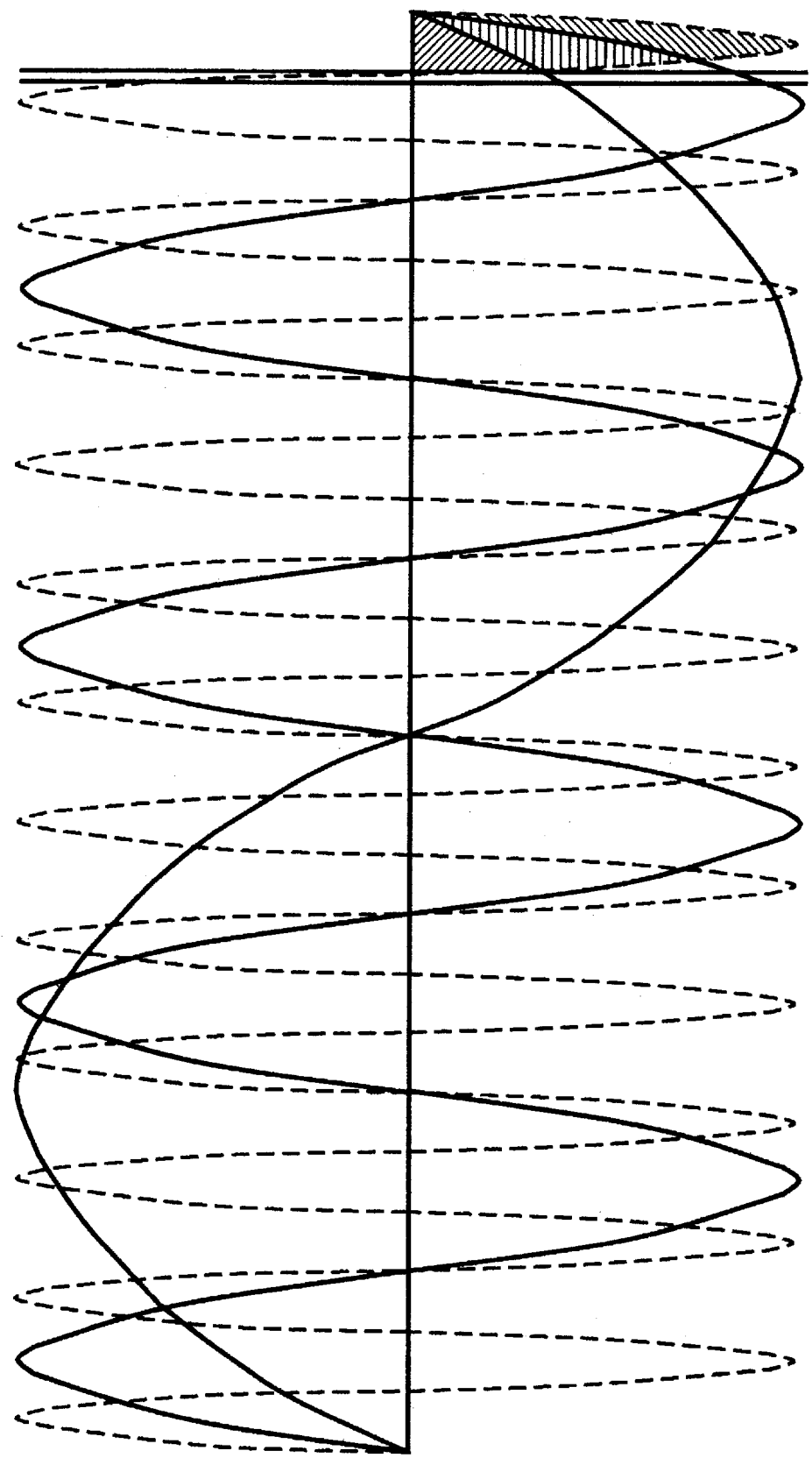
FIG. 1 is a graphical representation of the registration errors for various frequencies of motor torque disturbance.

Although the strategy of incorporating synchronism allows relaxation of the run out specification, there is a problem with the periodic higher frequency of the motor torque disturbance and its harmonics. This is true because even though the circumference of a roll turning at 3 hertz, for example, may be only a few degrees out of phase for rotation with respect to the image pitch, resulting in very little registration error, the 8 hertz, 16 hertz, and higher frequency disturbances produced by the motor will be much more out of phase, resulting in a larger registration error. These errors are illustrated graphically in FIG. 1. Using the shaded area corresponding to registration error under the lowest frequency pulse as a reference of 1, the mid frequency error would be 3.7, and the high frequency error would be 4.9.

Due to the phase problem, the magnitude of the disturbances must be made as small as possible at higher frequencies. One way of reducing certain of these disturbances is to feed back the motor velocity in addition to the surface velocity. A second way to reduce the magnitude of these disturbances is to add an inertia flywheel on the motor output drive shaft. However, adding an inertia flywheel requires additional space and size that puts severe restrictions on the design for new printing machines. Thus, if the torque disturbances can be minimized or eliminated without the use of the inertia flywheel, a smaller more compact printing machine can be designed.

Figure 2:
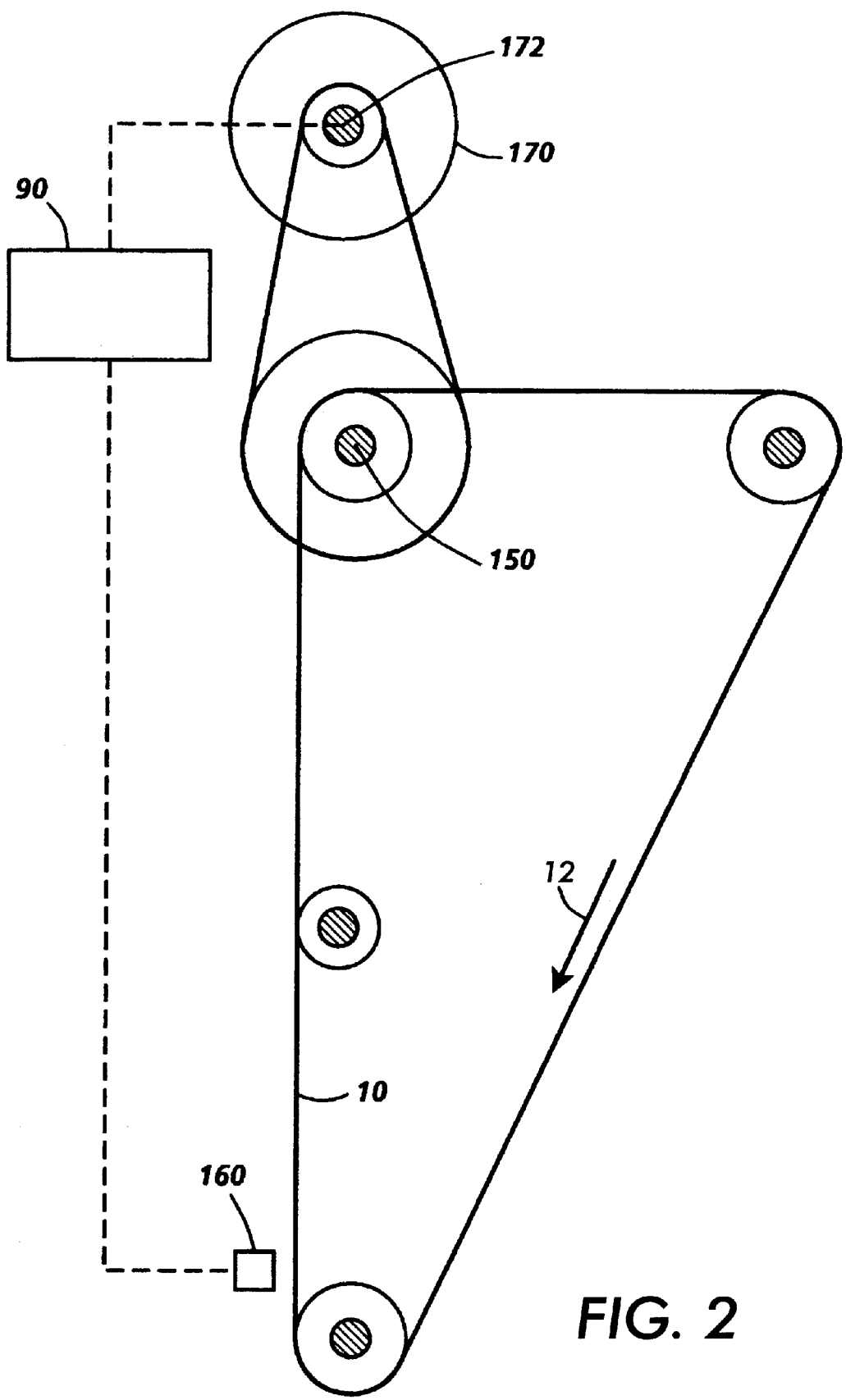
FIG. 2 is a schematic representation of a photoreceptor drive system in a multi-color electrophotographic printing machine.

Turning now to FIG. 2, there is illustrated a schematic representation of an intermediate belt drive system of FIG. 5 utilizing the velocity control of the present invention. In the illustrated system, the belt 10 moves in the process direction indicated by arrow 12 through various processing stations. The belt 10 is driven by drive roll 150 which is connected to a drive motor 170. The velocity control system utilizes a speed sensor 160 to detect the surface velocity of the intermediate belt 10. A second speed sensor, preferably in the form of an encoder, is used on the output shaft 172 of the drive motor 170 to accurately measure the rotational speed of the drive motor output shaft 172. Of course, the control system described can also be used to control photoreceptor drums or belts in printing machines utilizing an intermediate transfer media or in direct image on image recording systems.

Figure 3:
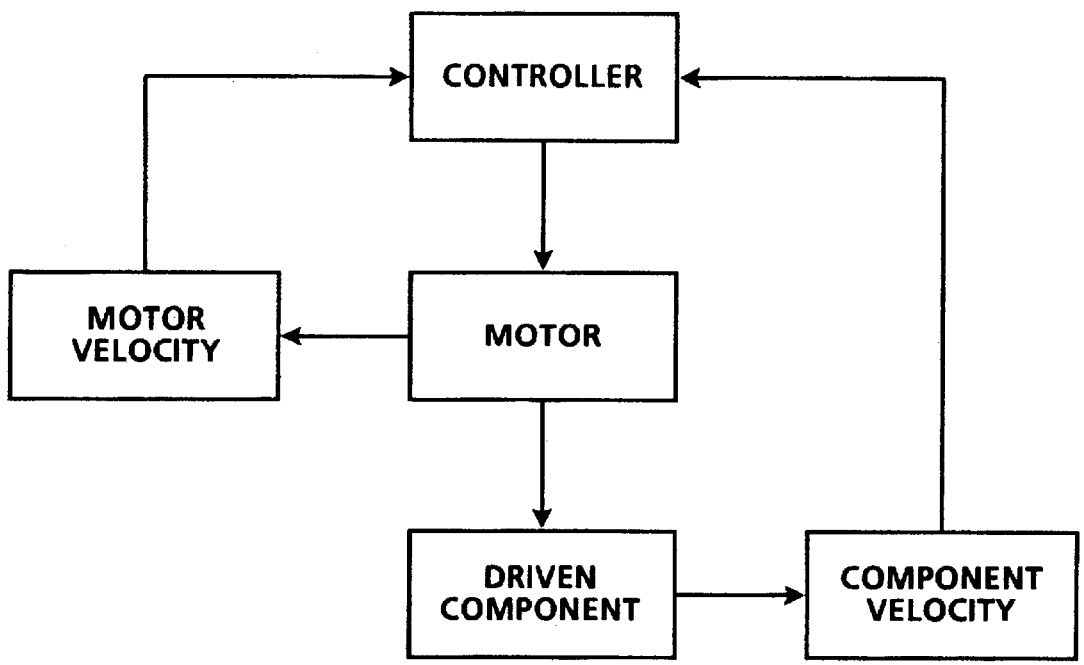
FIG. 3 is a flow diagram illustrating the method of the present invention to precisely control the speed of a electromechanical system.

FIG. 3 illustrates a flow chart of the servo control system utilized for the velocity control system herein. The servo system utilizes a two loop feedback system in which the surface velocity of the photoreceptor is fed back into the main velocity controller and a secondary motor velocity feedback loop is utilized to additionally reduce velocity errors due to motor torque disturbances. This dual feedback loop is found to be particularly effective at reducing motor torque disturbances and can minimize or eliminate the need for an inertia fly wheel to reduce velocity error due to motor torque disturbances.

Figure 4A:
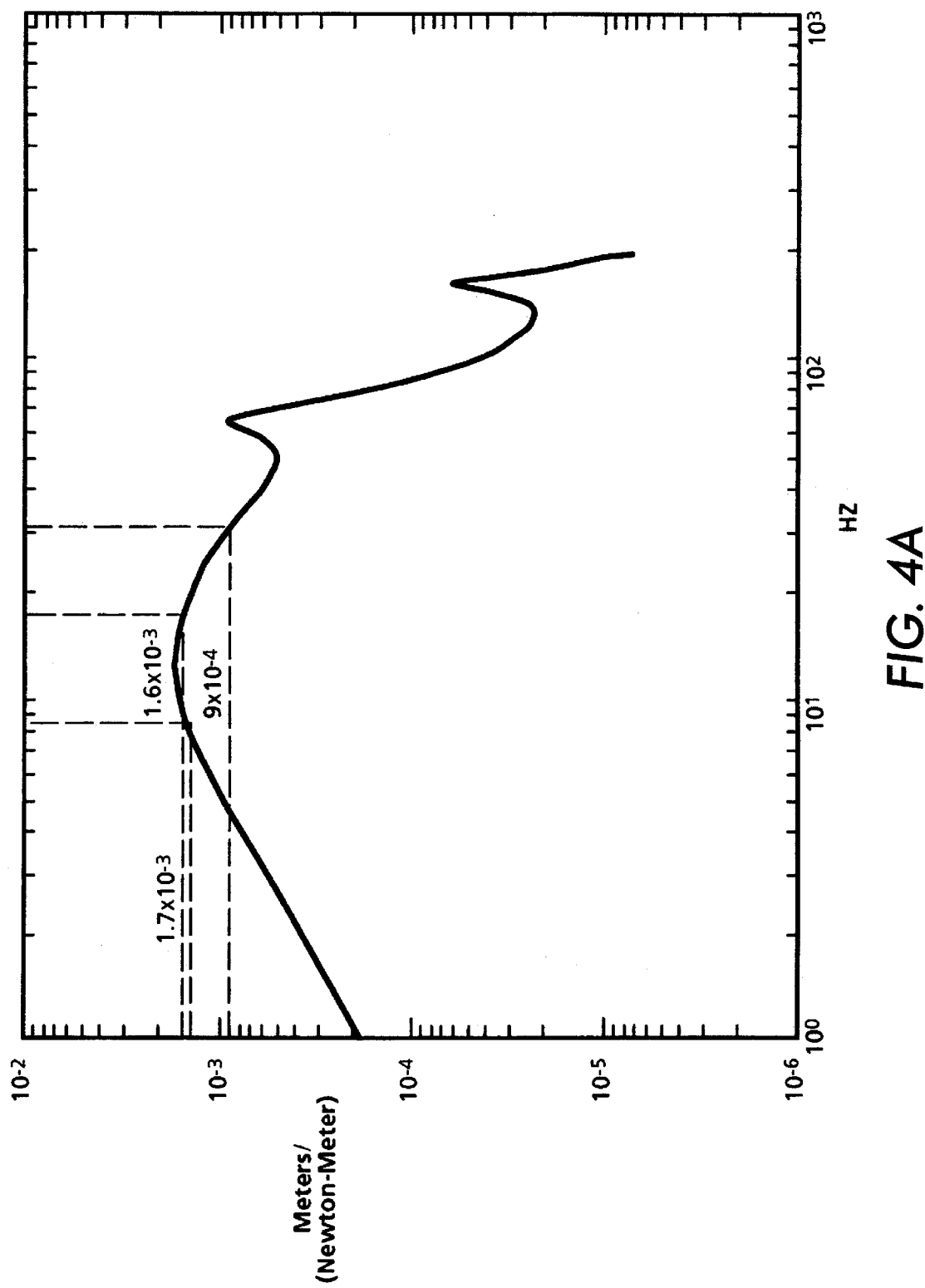
FIGS. 4A and 4B are graphical comparisons of the torque response curve with and without the control system of the present invention.
Figure 4B:
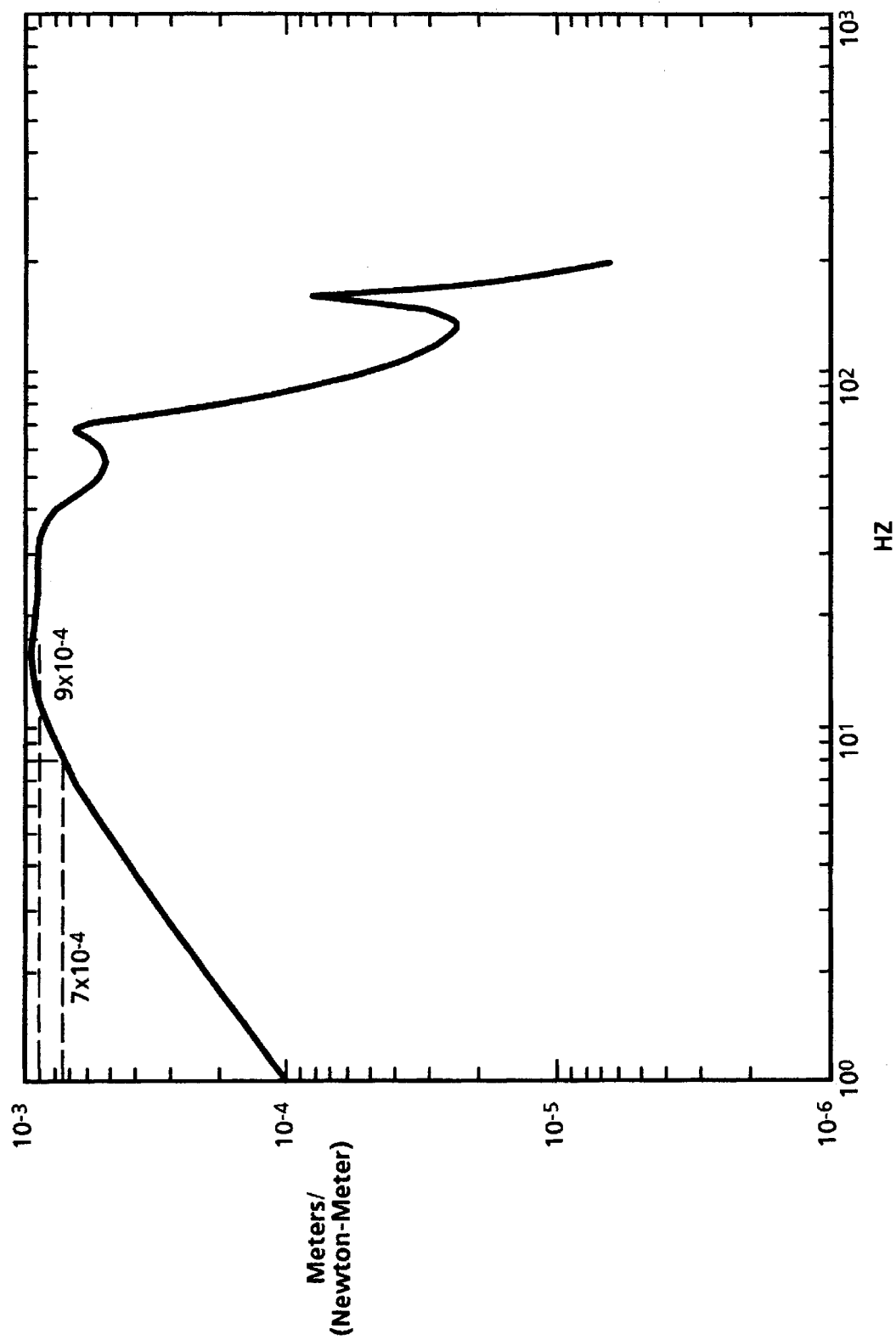

FIGS. 4A and 4B graphically illustrate two torque response curves. FIG. 4A illustrates a torque response curve utilizing a photoreceptor drive system without the velocity control system of the invention herein. This measure of the system performance desribes the motion of the driven component ratioed to the amount of torque fluctuation at the motor. FIG. 4B illustrates the torque response curve utilizing the dual feedback system. It can be seen that there is a two to three time improvement of the torque disturbance at the 8 hertz and 16 hertz response points. The 8 and 16 hz. frequencies are indications of motor torque error frequencies. This improvement will result in a proportional improvement in the magnitude of the photoreceptor velocity variation due to torque variations of the motor at its fundamental frequency in its first harmonic. This in turn will proportionally reduce the corresponding registration errors caused by the asynchronicity in the system.

In recapitulation, there is provided an apparatus and method for precisely controlling a driven component in an electromechanical system, particularly for controlling the speed of a photoreceptor or intermediate transfer belt in an electrophotographic printing machine. A sensor monitors the speed of the driven belt and generates and sends a signal indicative thereof to a controller. A second sensor monitors the rotational speed of the drive motor for the component and also generates a signal indicative thereof and sends that signal to the controller. The controller processes the signals so that a preselected belt speed is maintained while minimizing or eliminating torque disturbances caused by the rapid fluctuation of the motor velocity without the necessity of using an inertial flywheel.

It is, therefore, apparent that there has been provided in accordance with the present invention, a precise velocity control system that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for controlling velocity of a motor component driven in a single direction by a motor, comprising:
   a first sensor to detect the velocity of the driven component in a single direction and generate a first signal indicative thereof;
   a second sensor to detect the velocity of the motor and generate a second signal indicative thereof; and
   a controller, responsive to the first signal and the second signal, for generating a motor control signal to prevent motor torque disturbances from affecting the velocity of the driven component.

2. An apparatus according to claim 1, wherein said first sensor comprises a photoemitter photoreceptor pair.

3. An apparatus according to claim 1, wherein said second sensor comprises an optical rotary encoder.

4. An apparatus according to claim 1, wherein said second sensor comprises a magnetic rotary encoder.

5. A method for controlling the velocity of a motor driven component in a single direction of an electromechanical system, comprising:
   detecting the velocity of the driven component in a single direction and generating a first signal indicative thereof;
   detecting the velocity of the motor and generating a second signal indicative thereof; and
   generating a motor control signal as a function of the first signal and the second signal to prevent motor torque disturbances from affecting the velocity of the driven component.

6. An electrophotographic printing machine having a precise velocity control for driving a member, comprising:
   a motor operatively connected to the member, to drive said member in a single direction;
   a first sensor operatively associated with the member to detect the velocity of the driven member and generate a first signal indicative thereof;
   a second sensor, to detect the velocity of said motor and generate a second signal indicative thereof; and
   a controller, responsive to the first signal and the second signal to generate a motor control signal to prevent motor torque disturbances from affecting the velocity of the driven member.

7. A printing machine according to claim 6, wherein said first sensor comprises a photoemitter photoreceptor pair.

8. A printing machine according to claim 6, wherein said second sensor comprises an optical rotary encoder.

9. A printing machine according to claim 6, wherein said second sensor comprises a magnetic rotary encoder.

10. A printing machine according to claim 6, wherein the driven member comprises a photoreceptor belt.

11. A printing machine according to claim 6, wherein the driven member comprises an intermediate transfer belt.

* * * * *